United States Patent [19]
Sakaguchi et al.

[11] Patent Number: 5,506,557
[45] Date of Patent: Apr. 9, 1996

[54] RADIAL ANISOTROPIC CYLINDER TYPE FERRITE MAGNETS AND THEIR MANUFACTURING METHODS AND MOTORS

[75] Inventors: Takehisa Sakaguchi, Sagamihara; Takahiro Sunaga, Machida; Jun Hoshijima, Amagasaki, all of Japan

[73] Assignee: Sumitomo Special Metals Company, Limited, Osaka, Japan

[21] Appl. No.: 146,190

[22] PCT Filed: Mar. 17, 1993

[86] PCT No.: PCT/JP93/00319

§ 371 Date: Jan. 18, 1994

§ 102(e) Date: Jan. 18, 1994

[87] PCT Pub. No.: WO93/19020

PCT Pub. Date: Sep. 30, 1993

[30] Foreign Application Priority Data

Mar. 18, 1992 [JP] Japan .................................. 4-093688
Sep. 3, 1992 [JP] Japan .................................. 4-262960

[51] Int. Cl.[6] .................... H01F 1/00; H02K 21/12
[52] U.S. Cl. ................... 335/302; 335/296; 310/156
[58] Field of Search ............................ 335/302, 303, 335/304, 305, 306

[56] References Cited

U.S. PATENT DOCUMENTS

| | | | |
|---|---|---|---|
| 4,211,195 | 7/1980 | Zechlin | 123/335 |
| 4,827,173 | 5/1989 | Corbach | 310/218 |
| 4,877,986 | 10/1989 | Shimizu | 310/153 |
| 4,992,768 | 2/1991 | Mozis | 335/306 |
| 5,093,595 | 3/1992 | Korbel | 310/156 |

*Primary Examiner*—Leo P. Picard
*Assistant Examiner*—Stephen T. Ryan
*Attorney, Agent, or Firm*—Watson, Cole, Grindle & Watson

[57] ABSTRACT

A high performance radial anisotropic cylinder-shape ferrite magnet for use in a motor to lower its noise and enable miniaturization thereof is formed of an integrated one-piece body formed of sintered Sr and/or Ba ferrite powders and has an axially-extending slit that is created before the body is sintered to reduce internal stress due to shrinkage. The slit can extend in parallel to both the axial and radial directions of the body, diagonally to both the axial and radial directions, or diagonally to the radial direction and parallel to the axial direction. The slit can be filled with a resin material.

12 Claims, 5 Drawing Sheets

11b

11c

RADIAL ANISOTROPIC CYLINDER TYPE FERRITE MAGNETS AND THEIR MANUFACTURING METHODS AND MOTORS

TECHNICAL FIELD

This invention relates to Sr ferrite and Ba ferrite compositions that are used in motors, etc., and in radial anisotropic cylinder type ferrite magnets compositions. This invention further concerns high performance radial anisotropic cylinder type ferrite magnets and their manufacturing methods to motors which do not require use of the usual segment magnets.

BACKGROUND ART

Conventional constructions of motors in which ferrite magnets are positioned in stators and rotors are shown in FIGS. 8, 9 and 10.

That is to say, the construction in FIG. 8 is an example of a motor utilizing a cylindrical ferrite magnet 1 on the stator side. The magnet is fastened to the inner circumference of the cylindrical yoke 2, and a rotor (not shown here) is placed in space 3 in the inner circumference side of the magnet. Usually, for a motor with such construction using a strong magnetic radial anisotropic ferrite magnet is difficult for the reasons explained later, and an isotropic cylinder type ferrite magnet 1 is utilized. As such, the motor has a relatively low output.

The construction shown in FIG. 9 is an example of a motor using a pair of segment magnets, 1a and 1b on the stator side. Each magnet is fastened to the inner circumference of the yoke 2, and a rotor (not shown) is positioned in the opposing space 3 on the inner circumference side where the magnetic pole system. Other motors use multiple segment magnets according to the number of magnetic poles. In such segment magnets, since it is possible to use a strong magnetic radial anisotropic ferrite magnet, they are used in relatively high output motors.

The construction shown in FIG. 10 is an example of a motor wherein a pair of segment magnets 1c and 1d are used on the rotor side. Each magnet is fastened to the outer circumference of the magnet support 5 and positioned within a stator (not shown) of the specified shape to configure a motor. Segment magnets 1c and 1d are ferrite magnets as shown in FIG. 9, and since they are strong magnetic radial anisotropic ferrite magnets, the motor produced has a relatively high output.

However, recently even for high output motors, from the point of view of simplification assembly (making the assembly operation more efficient) and preventing cogging, it has been sought to find a motor construction which positions radial anisotropic cylinder type ferrite magnets which have equivalent or better magnetic properties than the above stated radial anisotropic ferrite magnets.

As a method of manufacturing such radial anisotropic cylinder type ferrite magnets, raw material powder such as Sr ferrite pulverized powder and Ba ferrite pulverized powder with an average particle size of less than 2 micro meter are molded into a cylindrical form using the dry method under a magnetic field and sintered. Due to the shrinkage factors for the circumferential and radial direction differs in sintering, internal stress accumulates to cause easy cracking, preventing the implementation of this method.

To prevent cracking in the sintering process, it has been proposed to use a mixture of 50~80 wt % Sr ferrite pulverized powder with an average particle size less than 2 micro meter and 50~20 wt % Ba ferrite isotropic granulated powder with a particle size of 14~200 mesh in the presence of a magnetic field end to mold it using the dry method (Patent Bulletin Heisei 1-48643).

However, the magnetic characteristic of radial anisotropic cylinder shape ferrite magnets industrially sintered utilizing this method have upper limits of Br=3.4 kG, $_BH_C$=2.9 kG, and (BH)max=2.6 MGOe, and these are not enough to satisfy recent high performance demands.

That is to say, without the availability of radial anisotropic cylinder shape ferrite magnets with strong magnetic properties, which are indispensable to realization of sought after high power out-put motors, it is difficult to satisfy this demand.

As explained shove, for example, one body high performance radial anisotropic cylinder shape ferrite magnets consisting of Sr ferrite were hard to manufacture, so that segment magnets which are generally less susceptible to cracking were manufactured from these compositions, and as shown in FIG. 9, a pair were positioned at opposing ends, or these magnets were assembled into cylinder shape.

Therefore, the utilization of multiple segment magnets not only complicated the assembly processes, but as shown in FIG. 9 when a pair were positioned at opposing ends, a large space is created between magnets in circumferential directions. Also, when magnets were assembled in a cylindrical shape, many patches (connecting parts) were unavoidably made in the circumferential directions; thus, creating the problem of coggings in motors.

Particularly when these motors were used as wiper motors and fan motors, etc., noise associated with coggings was generated; and it was necessary to consider the environmental impact for those who work close to such motors.

As the other manufacturing method for radial anisotropic cylinder shape ferrite magnets for motors, a special molding die has been proposed (Patent Bulleten Heisei 4-19684). That is to say, in order to avoid cracking when sintering, 2 or 3 pieces of shape edged protrusions are placed radially to the rod of extrusion molding die or the mandrel of the rolling device. When the cylindrical molding is slid toward the axis to be released, inside the inner circumference the cross sectional V shaped 2 or 3 cuts which are extended axially are formed; and when sintered, and particularly in the cooling process, the internal stress is all focused on these cuts to prevent micro crackings in other parts of the molding.

However, the above stated method prevents complex cracking, and to make repair by adhesives easy, for example, to obtain above stated segment magnets by making cuts and crack magnets at predetermined places by focussing the internal stress. Therefore, this is not the method to obtain a uniform cylindrical shape ferrite magnet, and it does not solve problems of segment magnets and their assembly.

This invention concerns the development of the high performance radial anisotropic cylinder shape ferrite magnets, and the objective is to be able to utilize the powder composition that has the strong magnetic properties; and to provide the high performance radial anisotropic ferrite magnets in one uniform body without having to assemble segment magnets and their manufacturing method. Also, this invention eliminates the problems mentioned above, it aims to provide motors that can make the assembly more efficient, and lower noise and the miniaturization possible.

SUMMARY OF INVENTION

Radial anisotropic cylinder shape ferrite magnets which consists this invented motor, by cutting the ferrite powder which contains Sr and/or Ba to be molded or after molding, a predetermined circumferential part of the cylinder is eliminated in an axial dimension to take into consideration of the shrinkage after sintering. The radial cross sectional shape molding is made into the letter C and sintered, and as sintered or after the out of roundness processing, the uniform cylindrical magnet is obtained except for slits, as shown in FIG. 2–FIG. 4.

In this invention, the object ferrite magnets are, as long as it has the ferrite composition which includes Sr or Ba, all magnets containing the ferrite composition regardless of its magnetic properties, and the manufacturing method of this invention can be applied.

That is to say, as the raw material powder, Sr ferrite pulverized powder with less than 2 micro meter average particle size and only Ba Ferrite pulverized powder can be used, and the mixture of these powders and Sr ferrite granulated powder which was difficult to manufacture without cracking using the conventional method (Patent Bulletin Heisei 1-48648) can also be used; furthermore, it is possible to use the raw material powder which contains other specified additives than Sr ferrite and Ba ferrite, and it is desirable to select according to desired molding dimensions and magnetic properties.

In this invention, a slit means a through slit which is formed thoroughly in radial and axial directions and not a hollow. It means a slit which is made by removing a part of the circumference of the cylinder shape molding and closed after sintering, but it is not limited to those slits that are totally closed prior to the sintering and it can have a small space. The proposal is made actively to utilize these small space in the following examples.

Also, it is not limited to those which form parallel to the radial direction or to the axial direction, but as it is shown in the actual example later, many shapes can be applied. According to the shapes, in addition to the effect due to a slit existence, other effects can also be attained.

Furthermore, the radial anisotropic cylinder shape ferrite magnet with a slit, the molding of which must be made into the letter C prior to sintering. But, this can be accomplished by first making the molding die into the required shape, or after it is molded into a cylindrical form, a silt with necessary width is made by the cutting and grinding work. Whichever method is chosen, these slits are determined inconsideration of shrinkage after sintering. Since the shrinkage rate is determined by the ferrite compositions, the molding dimension, and the sintering condition, they must be determined carefully with each factor. Moreover, these moldings are not only limited to the dry molding method but the same effect can be obtained from the wet method.

The sintering condition for the radial anisotropic cylinder shaped ferrite magnet used for this invented motor is selected according to the above stated ferrite composition or the molding dimensions. It is recommended, particularly, that the internal stress due to the difference of shrinkage rate of circumferencial and radial direction in sintering can easily released through a slit made on the molding, so that the sintering condition and the shape of a jig must be carefully designed to accomplish it. Also, the sintering process alone produces a required cylinder shape, but to make it further into a cylinder shaped ferrite magnet with the specified inside and outside diameters, the out of roundness process is applied by the usual cutting and grinding work.

This invention is characterized by preventing accumulation of the internal stress when sintering a cylinder shaped powder molding consisting of Sr and/or Ba ferrite, for example, by eliminating a circumferential section of the cylinder shaped molding axially along to make the cross sectional shape into the letter C, and sintering it. By making the shape of the molding into the letter C, the space in which to alleviate the internal stress due to differences in the shrinkage rate of circumferencial and radial direction is installed by a slit to release the stress. Thus, even using the raw material which has strong magnetic properties, cracking will not result in sintering, the high performance radial anisotropic cylinder shape magnet can be easily obtained, and the high performance motor can be made by effectively positioning the high performance radial anisotropic cylinder shape ferrite magnets.

BEST MODE FOR CARRYING OUT THE INVENTION

Example 1

Using 100% pulverized powder of Sr ferrite with the average particle size of less than 2 micro meter, in order to manufacture a cylinder shaped ferrite magnet with the dimension of 50 mm (outer radius)×40 mm (inner radius)× 20 mm (thickness), two groups of moldings with the identical dimension were made. One group was sintered as usual, while a circumferential section from the other molding group was eliminated to make a cross sectional letter C and sintered using the invented manufacturing method. Two types of the radial anisotropic cylinder shape ferrite magnets were manufactured.

Magnets obtained from the same molding condition (molding pressure 1 ton/cm$^2$) and the sintering condition (1200° C.×1 hour) both had the magnetic characteristics of Br=3.8 kG, $_BH_C$=3.05 kG, and (BH)max=3.3 MGOe.

As far as the rate of cracking, while the usual method produced cracking in all, this invented method produced none.

Example 2

Using 100% pulverized powder of Ba ferrite with the average particle size of less than 2 micro meter, in order to manufacture a cylinder shaped ferrite magnet with the dimension of 65 mm (outer radius)×50 mm (inner radius)× 25 mm (thickness), two groups of moldings with the identical dimension were made. As in Example 1, one group was sintered as usual, while the other group utilized the invented manufacturing method to obtain two types of the radial anisotropic cylinder shape ferrite magnets.

Magnets obtained from the same molding condition (molding pressure 1 ton/cm$^2$) and the sintering condition (1200° C.×1 hour) both had the magnetic characteristics of Br=3.6 kG, $_BH_C$=2.0 kG, and (BH)max=2.7 MGOe.

As far as the rate of cracking, while the usual method produced cracking in all, this invented method produced none.

Example 3

Using the mixture of 50~80 wt %, pulverized powder of Sr ferrite with the average particle size of less than 2 micro meter and 50~20 wt % granulated Ba ferrite with 14~200 meshes, in order to 40 mm (outer radius)×32 mm (inner radius)×15 mm (thickness), two groups of moldings with the identical dimensions were made. As in Example 1, one group was sintered as usual, while the other group utilized the invented manufacturing method to obtain two types of the radial anisotropic cylinder shape ferrite magnets.

Magnets obtained from the same molding condition (molding pressure 1 ton/cm$^2$) and the sintering condition 1200° C.×1 hour) both had the magnetic characteristics of Br=3.6 kG, BHC=2.95 kG, and (BH)max=2.75 MGOe.

As far as the rate of cracking, while this invented method produced none, the usual method produced cracking in all magnets.

Example 4

Figure 1:
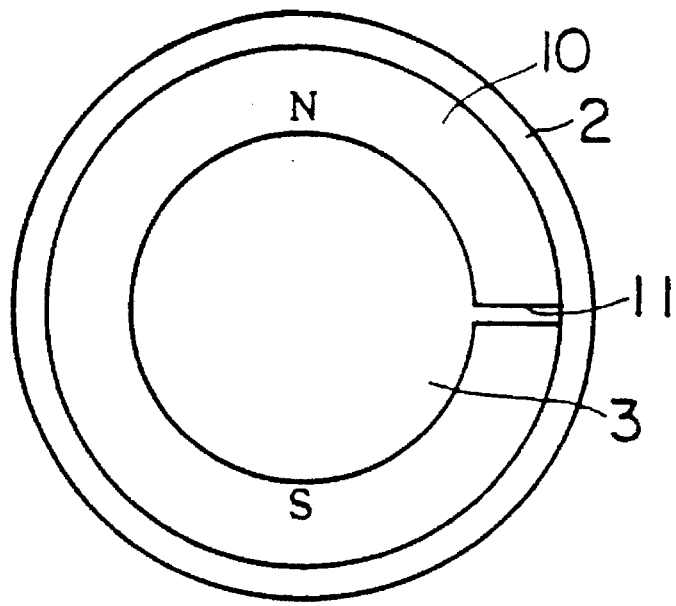
FIG. 1 is a stator plan of an example of this invented motor.

In FIG. 1, 10 denotes ferrite magnet containing Sr which is made from the above manufacturing method, and except at a slit 11 it is a uniform radial anisotropic cylinder shape ferrite magnet. Here, the out of roundness process is administered after sintering, the magnet is pressure fastened to the inner circumference 2 of the cylinder shape yoke to comprise stator. Furthermore, by positioning rotor (not shown) in space 3 of the inner circumference of the ferrite magnet 10, the object motor is obtained.

Figure 2:
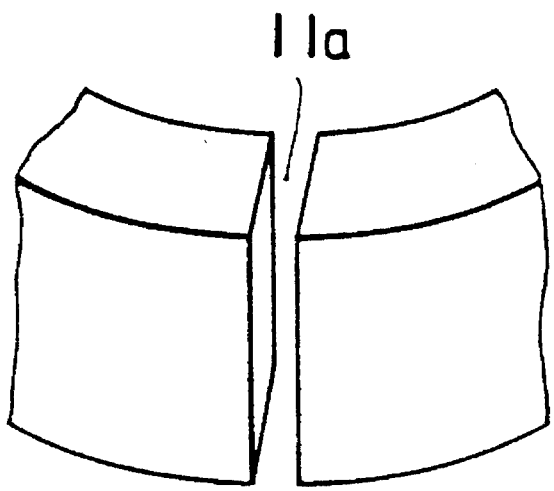
FIG. 2 is a partially expanded plan of a slit in this invented radial anisotropic cylinder shape ferrite magnet.
Figure 3:
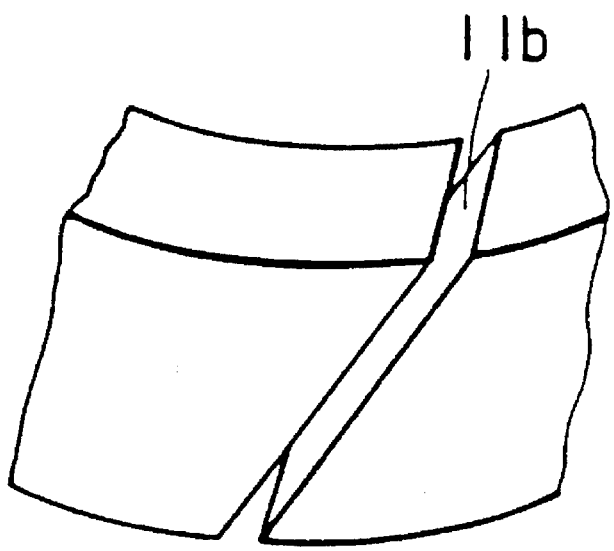
FIG. 3 is a partially expanded plan of a slit in this invented radial anisotropic cylinder shape ferrite magnet.
Figure 4:
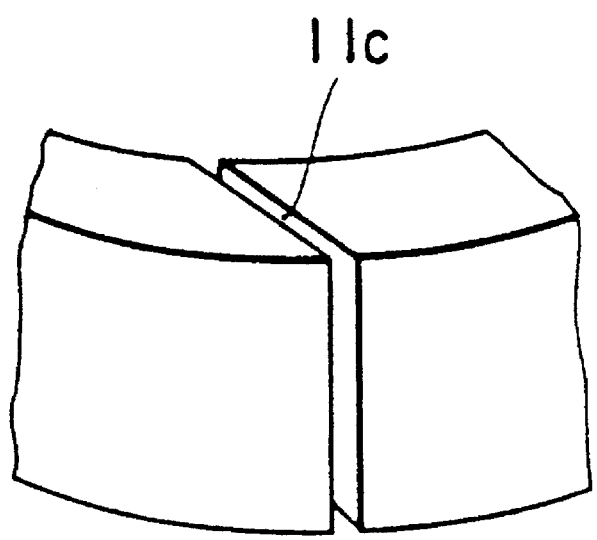
FIG. 4 is a partially expanded plan of a slit in this invented radial anisotropic cylinder shape ferrite magnet.

The slit 11 which is formed on the radial anisotropic cylinder shape ferrite magnet 10, as shown in FIG. 2 is not limited to a slit 11a composition which is parallel to the radial or axial directions, but as shown in FIG. 3, a slit 11b (the magnet thickness gradually changes in the axial direction) can be oblique to the axial direction, or as shown in FIG. 4, a slit 11c (the magnet thickness gradually changes in the radial direction) which is oblique to the radial direction is possible.

Particularly, in the constructions of FIG. 3 and FIG. 4, the magnetic disturbance from the existence of the slits can be moderated. In the construction of FIG. 3, since the mechanical strength improves against the axial force, when the radial anisotropic cylinder shape ferrite magnet is pressure fastened to the inner circumference of the cylinder shape yoke 2, it can prevent damage.

In FIG. 1 to FIG. 4 the slits were shown magnified, in this invented motors whether slits are connected or disconnected as the figures the same effect can be obtained.

Example 5

Figure 5:
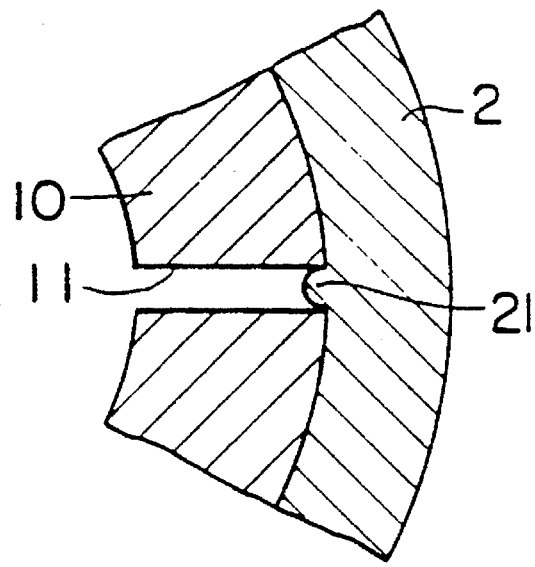
FIG. 5 is a partially expanded plan which shows the connection of magnet and yoke which consists stator in this invented motor.

In FIG. 5 shows the same when a slit is not connected and how effectively it is used. If the protrusion 21 to determine the magnet position is made in the inner circumference of the cylinder shape yoke 2, it is possible to align a slit 11 to the protrusion 21, which results in improving assembly accuracy of the radial anisotropic cylinder shaped ferrite magnet 10 and the cylinder shaped yoke 2. If further improves accuracy of positioning other composition materials (not shown) which are positioned using the cylinder shaped yoke 2 as the reference and the radial anisotropic cylinder shape ferrite magnet 10, and which will also decrease the torque disturbance generation of motors.

Also, when magnetizing the radial anisotropic cylinder shaped ferrite magnet 10 by itself before pressure fastened to the cylinder shaped yoke 2, or magnetizing it after it is pressure fastened to the cylinder shape yoke 2, as in the case of the protrusion 21 which is to help determine the position of the magnet, by making a protrusion to determine the magnet position in the magnetizer (not shown) and aligning it with the slit 11, it is possible to increase accuracy in the magnetic polar positioning.

Furthermore, the protrusion 21 formed on the inner circumference of the above mentioned cylinder shape yoke 2, which is to determine the position of magnet, can also prevent circumferential movement after the radial anisotropic cylinder shaped ferrite magnet 10 is fastened by pressure of adhesives to the cylinder shaped yoke 2.

Figure 6:
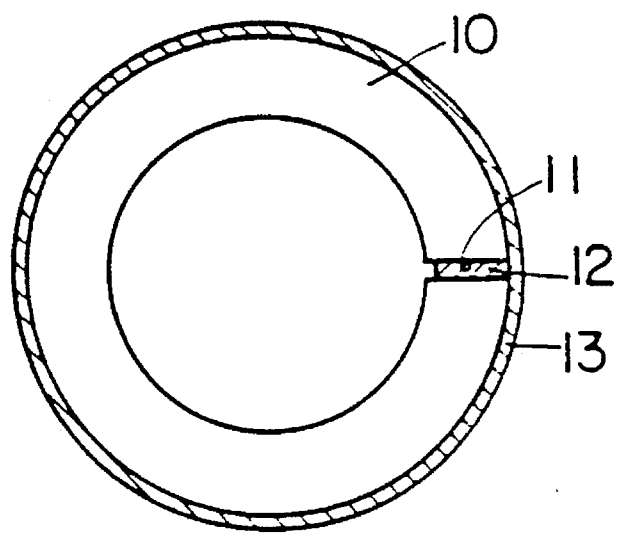
FIG. 6 is a plan which shows the composition to illustrate the mechanical strength of magnet which comprises stator in this invented motor.

When concerned about the mechanical strength of the radial anisotropic cylinder type ferrite magnet 10 due to the presence of a slit 11, after sintering, adhesives and other resins can be filled into the slit 11 and hardened; or as shown in FIG. 6, a magnetic thin plate 12 with a specified thickness can be inserted; furthermore, the outer circumference of the magnet 10 is surrounded by a magnetic thin plate 13. It is possible to make handling of the radial anisotropic cylinder shape ferrite magnet easy by utilizing such compositions.

In any of the above constructions, even not applying special shapes such as in FIG. 3 and FIG. 4 to the slit 11 formed on the radial anisotropic cylinder shape magnet 10, if it is placed at the neutral position of the magnetic field made by the magnet 10 and give consideration to the resultant magnetic pole positions, the magnetic disturbance due to the slit 11 will not occur and does not interfere with motor characteristics.

Example 6

Figure 7:
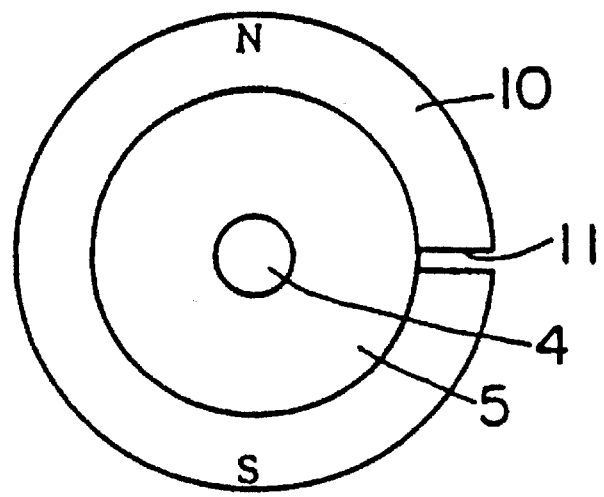
FIG. 7 is an another example plan of this invention, which shows only the rotor composition of the motor.
Figure 8:
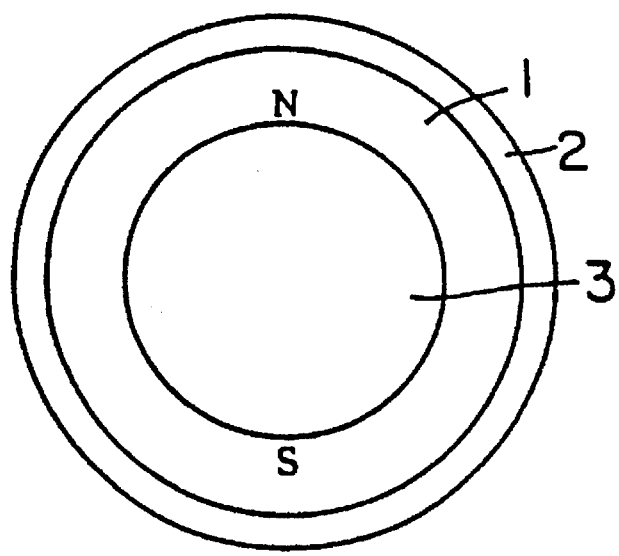
FIG. 8 is a plan which shows a part of stator of motor using the usual ferrite magnets.

FIG. 7 shows other example of this invention, particularly, it only displays the rotor composition of motor. That is to say in FIG. 7, the magnet 10 consists of the ferrite composition with Sr which is manufactured according to the above method, and except at a slit 11 at the radial and axial directions, it is a uniform radial anisotropic cylinder shape ferrite magnet. Here, the out of roundness process is applied after sintering, and fastened to the outer circumference of the magnet support 5 to which a rotor axis 4 is fastened in the center. They are positioned inside stator (not shown) to comprise motor.

In this construction, too, for the radial anisotropic cylinder shape ferrite magnet 10, the same technology used for the above stator construction can be utilized.

Especially, a protrusion (not shown) to determine the magnet position is formed on the outer circumference of the magnet support 5, by fastening the slit 11 along the protrusion, the circumferential fastening strength of the radial anisotropic cylinder shaped ferrite magnet 10 improves and prevent the movement in the rotor revolution.

Example 7

The sintered body obtained in Example 1 was further processed by the out-of-roundness method to attain the desired dimension, and pressure fastening it to the cylinder shape yoke to obtain the invented motor shown in FIG. 1.

Figure 9:
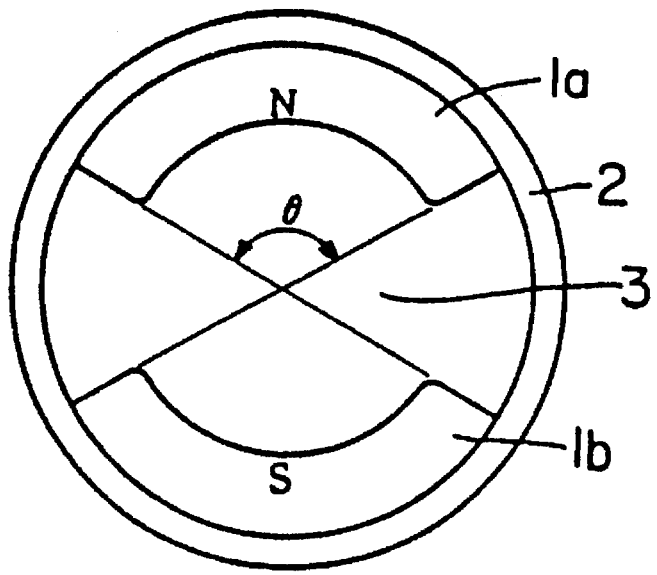
FIG. 9 is a plan which shows a part of stator of motor using the usual ferrite magnets.
Figure 10:
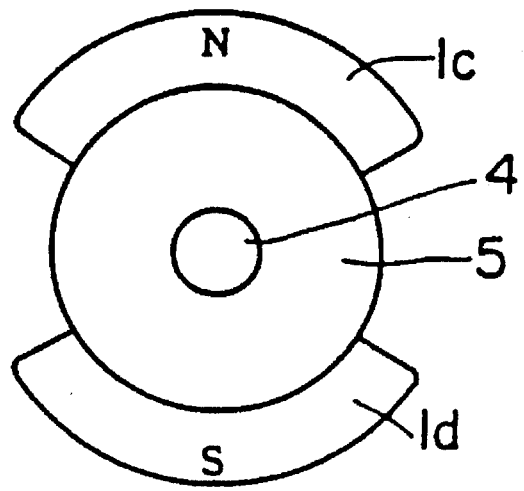
FIG. 10 is a plan which shows a part of rotor of the motor composition using the ferrite magnet.

Positioning the radial anisotropic segment ferrite magnets which is equivalent in the magnetic properties as in the above stated radial anisotropic cylinder shape ferrite magnet, and the dimension such as the outside diameter, inside diameter, and the height with the angle θ135° as shown in FIG. 9 the usual motor was made and compared. This invented motor, in comparison to the conventional motor, reduced the cogging noise by about 50~ 60%, and the increase total magnetic flux resulted in the improvement of 15~ 20% torque revolution.

Example 8

The sintered body obtained in Example 2 was further processed by the out-of-roundness method to attain the desired dimension, and pressure fastening it to the cylinder shape yoke to obtain the invented motor shown in FIG. 1.

Positioning the radial anisotropic segment ferrite magnets which is equivalent in the magnetic properties as in the above stated radial anisotropic cylinder shape ferrite magnet, and the dimension such as the outside diameter, inside diameter, and the height with the angle θ135° as shown in FIG. 9 the usual motor was made and compared. This invented motor, in comparison to the conventional motor, reduced the cogging noise by about 60~ 70%, and the increase total magnetic flux resulted in the improvement of 10~ 15% torque revolution.

INDUSTRIAL APPLICABILITY

This invention, as it is obvious from examples mentioned above, enables the manufacturing of a high performance radial anisotropic cylinder shaped ferrite magnet, which hitherto could not be manufactured due to cracking in sintering. Also, the radial anisotropic cylinder shaped ferrite magnet according to this invention, as compared with using the usual ferrite compositions, it the cracking rate remarkable decreases while the magnet mechanical strength improves.

This invented motor, as it is obvious from examples mentioned above, by positioning the high performance radial anisotropic cylinder shaped ferrite magnet which could not be produced to due to cracking, in comparison to the high performance conventional cylinder shaped ferrite magnets which were assembled from segment magnets, its magnet assembly is simplified and can achieve the better efficiency in the motor assembly.

Furthermore, it practically possesses the same magnetic field distribution as a uniform radial anisotropic cylinder shaped ferrite magnet, the cogging generation can be lowered and the noise due to coggings can be lowered. Furthermore, in comparison to segment magnets, since the total magnetic flux generated increased, if the same power out put is desired the minaturiztaion can be accomplished.

We claim:

1. A radially anisotropic cylindrical ferrite magnet composed of a ferrite containing at least one element selected from the group consisting of Sr and Ba, said ferrite magnet having a complete roundness formed by grinding the inner and outer peripheral surfaces of the cylindrical ferrite magnet after sintering thereof and a slit extending in an axial direction thereof, and being an integrated one-piece body except for said slit.

2. The radially anisotropic cylindrical ferrite magnet as claimed in claim 1, wherein said slit extends in parallel to both said axial direction and a radial direction of said cylindrical ferrite magnet.

3. The radially anisotropic cylindrical ferrite magnet as claimed in claim 1, wherein said slit extends diagonally to both a radial direction and said axial direction of said cylindrical ferrite magnet.

4. The radially anisotropic cylindrical ferrite magnet as claimed in claim 1, wherein said slit extends diagonally to a radial direction of said cylindrical ferrite magnet, but in parallel to said axial direction thereof.

5. The radially anisotropic cylindrical ferrite magnet as claimed in claim 1, including a resin material filling said slit.

6. The radially anisotropic cylindrical ferrite magnet at claimed in claim 1, including a thin magnetic plate in said slit.

7. The radially anisotropic cylindrical ferrite magnet at claimed in claim 1, wherein said magnet is encircled with a thin magnetic plate.

8. A motor comprising a radially anisotropic cylindrical ferrite magnet composed of a ferrite containing at least one element selected from the group consisting of Sr and Ba, said ferrite magnet having a complete roundness formed by grinding the inner and outer peripheral surfaces of the cylindrical ferrite magnet after sintering thereof and a slit extending in an axial direction thereof, and being an integrated, one-piece body except for said slit.

9. The motor as claimed in claim 8, wherein a cylindrical yoke is provided on its inner periphery with a protrusion which is fitted in said slit to fix said ferrite magnet at a predetermined position.

10. The motor as claimed in claim 8, including a resin material filling said slit.

11. The motor as claimed in claim 8, including a thin magnetic plate in said slit.

12. The motor as claimed in claim 8, wherein said magnet is encircled with a thin magnetic plate.

* * * * *